UNITED STATES PATENT OFFICE 2,290,945

PRINTING OF TEXTILE FABRICS

Miles A. Dahlen and Charles J. Sala, Wilmington, Del., and Richard A. Shimp, Penns Grove, N. J., assignors to E. I. du Pont de Nemours & Company, Wilmington, Del., a corporation of Delaware No Drawing. Application June 29, 1940, Serial No. 343,260

6 Claims. (Cl. 8—62)

This invention relates to the printing of textiles wherein water-solubilized derivatives of insoluble dyes are used as the dyestuff ingredient of the printing pastes, the solubilizing groups being acyl groups of a kind which can be hydrolyzed off by chemical reagents after the dyestuff derivative is applied to the fabric, thereby regenerating the insoluble dye and producing an insoluble dyeing; and especially to improvements in the printing compositions containing such dyestuffs and to processes.

The solubilized derivatives of the insoluble dyes are condensation products which are represented by the general formula R—M in which R is the radical of the insoluble dye. It contains at least one group of the class consisting of hydroxy and imino (i. e. an —NH— group) that is capable of being condensed with a water-solubilizing acyl group. The symbol M represents the radical of the water-solubilizing acyl group. It must be capable of being hydrolyzed off by the action of alkalis after the condensation product is applied to the fiber. The symbol R represents the radical of any insoluble dye of the kind described, such as an insoluble azo, nitro, anthraquinone, triphenylmethane, azine or oxazine dye. The subsequent saponification splits off the acyl group, and regenerates the insoluble dye on the fiber.

The solubilized derivatives, R—M are used in their aqueous solutions or suspensions to produce dyeings or printings on desired materials as by dyeing, padding or printing by known methods. The dyeing is then subjected to a saponifying treatment as with alkaline reagents, such as solutions of ammonia, sodium carbonate, caustic soda, trisodium phosphate or alkali acetate. Upon saponification of the acyl group the initially soluble acylated derivative of the insoluble or sparingly soluble dye becomes fixed on the fiber as an insoluble dyeing. The simplest forms of such dye derivatives contain only one M— group but more than one may be present.

Heretofore difficulty has been encountered in producing fully satisfactory strong and bright prints from printings made with such solubilized dyestuffs. Consequently many of the otherwise valuable properties of the dyes have not been made fully available in printing practices. In printing with this type of dyes it was also known that some kind of a printing assistant was desirable in the printing paste in order to produce desirable dyeings with such dyestuffs, but the known operable assistants were relatively high molecular weight compounds, often technically difficult and costly to manufacture in good yield. The printing of textiles with these colors was not entirely satisfactory for reasons such as cost of the assistants, stability of the printing compositions, difficulty of manipulation in making the printing paste or by reason of some disadvantageous property which the assistant imparted to the printing paste or printed textile, such as an unpleasant odor. Consequently many of the valuable properties of the dyes had not been made available and improvements were desirable.

It is among the objects of this invention to provide brighter prints upon textiles which are printed with such solubilized dye derivatives, than have hitherto been possible. Another object is to provide stronger prints from a given amount of dye derivative. Another object is to avoid the use of costly assistants and those which have an unpleasant odor. A further object is to provide new printing pastes and processes. Still other objects of the invention will be apparent from the following description.

The objects of this invention are accomplished in general by incorporating into a solution or a printing paste containing the water-solubilized dyestuff, an assistant from the group consisting of amides, cyclic and heterocyclic compounds which are represented by the formulae

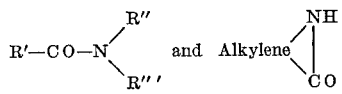

wherein R' is one of a group consisting of hydrogen, methyl, ethyl and the hydroxy-, methoxy-, ethoxy- and halogen-derivatives of methyl and ethyl; the group

represents an amine group wherein R" and R''' are each connected only to nitrogen and each is from the group consisting of hydrogen, alkyl having 1 to 5 carbons and the corresponding hydroxyalkyl groups; those in which R" and R''' jointly with nitrogen are the radicals of piperidine and morpholine; and those in which Alkylene is an alkylene radical having 3 to 5 carbons.

The invention will be more fully set forth in the following more detailed description which includes examples that are given as illustrative embodiments of the invention and not as limitations thereof.

Example I

Six grams of the product prepared by the action of benzoic-acid-m-sulfon-chloride upon the azo dye obtained by coupling diazotized 2-amino-4-chloro-diphenyl-ether to the anilide of 2-hydroxy-3-naphthoic-acid were dissolved in 18 g. of warm formamide. To this solution were added 20 cc. of water, 50 grams of starch tragacanth thickening and 6 g. of 20% tri-sodium-phosphate solution. The paste was thoroughly mixed and printed from an engraved roller onto cotton cloth. The cloth was dried thoroughly in a hot flue and aged for 10 minutes in a rapid ager of the Mather-Platt type. The print was finished by the following steps: immersion for 5 minutes in a cold solution containing per liter, 15 g. barium chloride, 50 g. of common salt and 30 cc. of 30° Bé. caustic soda; neutralization by treating for 3 minutes at 140° F. in a bath containing 5 cc. of 37% hydrochloric acid per liter; rinsing; soaping 5 minutes at 160° F; rinsing and drying in a hot flue. The resulting red print was very much brighter and stronger than that obtained in the absence of the amide.

Example II

Cotton cloth was printed with a thickened paste having the following composition:

| | |
|---|---|
| The product obtained by the reaction of benzoic-acid-m-sulfon-chloride upon the azo dye obtained by coupling diazotized 4-benzoyl-amino-2,5-diethoxy-aniline to the anilide of 2-hydroxy-3-naphthoic acid _____parts__ | 6 |
| Formamide_____do____ | 18 |
| Water _____do____ | 20 |
| Starch-tragacanth thickening_____do____ | 50 |
| 20% tri-sodium-phosphate_____do____ | 6 |

The print was finished as described in Example I. A blue print of very much better strength and brilliancy was produced than could be obtained in the absence of formamide.

Example III

Six grams of the product prepared by the action of benzoic-acid-m-sulfon-chloride upon the azo dye obtained by coupling diazotized 2-amino-4-chloro-diphenyl-ether to the anilide of 2-hydroxy-3-naphthoic-acid were dissolved in a solution of 18 g. acetamide in 20 g. of water. Fifty grams of starch-tragacanth thickening, and 6 g. of 20% tri-sodium-phosphate were added and the paste was mixed thoroughly. Cotton cloth was printed with this paste, dried, aged 5 minutes in the Mather-Platt ager, treated in a cold bath containing per liter 15 g. BaCl₂, 50 g. NaCl and 30 cc. caustic soda 36° Bé. for 5 minutes, neutralized by immersing for 3 minutes at 140° F. in a 0.16% hydrochloric acid solution, rinsed, soaped, rinsed and dried. A red print resulted which was superior in strength and brilliancy to one obtained in the absence of the amide.

Example IV

Cotton cloth was printed with a paste having the following composition:

| | |
|---|---|
| The product prepared by the action of benzoic-acid-m-sulfon-chloride upon the azo dye obtained by coupling diazotized 2-amino-4-chloro-diphenyl-ether to the anilide of 2-hydroxy-3-naphthoic-acid___g____ | 6 |
| Glycolic acid amide_____g____ | 18 |
| Water _____g____ | 20 |
| Starch-tragacanth thickening_____g____ | 50 |
| 20% tri-sodium-phosphate_____g____ | 6 |

The printed cloth was finished as described in Example I. A red print of very much superior brilliancy and strength was produced than was obtained in the absence of the glycolic acid amide. The print was much brighter than a print made with a paste in which thiodiglycol was used instead of glycolic acid amide.

Example V

A paste having the following composition was printed on cotton cloth:

| | |
|---|---|
| The product prepared by the action of benzoic-acid-m-sulfon-chloride upon the azo dye obtained by coupling diazotized 2-amino-4-chloro-diphenyl-ether to the anilide of 2-hydroxy-3-naphthoic-acid__parts__ | 6 |
| N-n-butyl-formamide_____do____ | 9 |
| Water _____do____ | 29 |
| Starch-tragacanth thickening_____do____ | 50 |
| 20% tri-sodium-phosphate solution___do____ | 6 |

The printed cloth was finished as described in Example I. A strong bright red print resulted which was superior to that obtained in the absence of the amide.

Example VI

Cotton cloth was printed from an engraved roll with a mixture having the following composition:

| | |
|---|---|
| The product prepared by the action of benzoic-acid-m-sulfon-chloride upon the azo dye obtained by coupling diazotized 2-amino-4-chloro-diphenyl-ether to the anilide of 2-hydroxy-3-naphthoic-acid__g____ | 6 |
| N,N-di-ethyl-acetamide _____g____ | 18 |
| Water_____cc____ | 20 |
| Starch-tragacanth thickening_____g____ | 50 |
| 20% tri-sodium-phosphate_____g____ | 6 |

The print was finished as described in Example I. A red print was obtained which was brighter and stronger than that produced in the absence of the amide.

Example VII

Eighteen grams of N,N-di-methyl-glycolamide was substituted for the N,N-di-ethyl acetamide of Example VI. A strong bright red print was obtained which was much superior to that produced in the absence of the amide.

Example VIII

Cotton cloth was printed with a paste having the following composition by weight:

| | |
|---|---|
| The product prepared by the action of benzoic-acid-m-sulfon-chloride upon the azo dye obtained by coupling diazotized 2-amino-4-chloro-diphenyl-ether to the anilide of 2-hydroxy-3-naphthoic-acid _____parts__ | 6 |
| N-formyl-morpholine _____do____ | 18 |
| Water _____do____ | 20 |
| Starch-tragacanth thickening _____do____ | 50 |
| 20% tri-sodium-phosphate solution___do____ | 6 |

The print was dried, saponified, neutralized and soaped by the procedure described in Example I. A bright red print resulted which was very much better in strength and brilliancy than that produced in the absence of the formyl-morpholine.

Example IX

Eighteen parts of symmetrical hexa-methylene-di-glycolamide was substituted in Example VIII for the N-formyl-morpholine. A bright red print was obtained which was very much brighter and stronger than that obtained in the absence of the amide. The print was much stronger than one made with a paste containing an equal proportion of thiodiglycol instead of symmetrical hexamethylene-di-glycolamide.

*Example X*

The following mixture was printed onto cotton cloth:

| | |
|---|---|
| The product prepared by the action of benzoic-acid-m-sulfon-chloride upon the azo dye obtained by coupling diazotized 2-amino-4-chloro-diphenyl-ether to the anilide of 2-hydroxy-3-naphthoic-acid____g__ | 6 |
| The amide of di-chloro-acetic acid_____g__ | 18 |
| Water _____g__ | 20 |
| Starch-tragacanth thickening _____g__ | 50 |
| 20% tri-sodium-phosphate solution_____g__ | 6 |

The printed cloth was finished as described in Example I. A red print resulted which was superior in strength and brilliancy to that obtained without the use of the amide.

*Example XI*

Cotton cloth was printed from an engraved roll with the following mixture:

| | |
|---|---|
| The product prepared by the action of benzoic-acid-m-sulfon-chloride upon the azo dye obtained by coupling diazotized 2-amino-4-chloro-diphenyl-ether to the anilide of 2-hydroxy-3-naphthoic-acid__g__ | 6 |
| N,N-di-ethyl-propionamide_____g__ | 18 |
| Water _____g__ | 20 |
| Starch-tragacanth thickening _____g__ | 50 |
| 20% tri-sodium-phosphate solution_____cc__ | 6 |

The printed goods were dried, immersed for 5 minutes in a cold bath containing 15 g. BaCl₂, 50 g. NaCl and 30 cc. caustic soda (36° Bé.) per liter, neutralized by treating for 3 minutes with 0.16% hydrochloric acid at 140° F., rinsed and soaped. A red print was obtained which had better strength and brilliancy than that prepared in the absence of the amide.

*Example XII*

Six parts of the product prepared by the action of benzoic-acid-m-sulfon-chloride upon the dye obtained by the condensation of 2 mols of beta-amino-anthraquinone and one mol of aniline with 1 mol of cyanuric chloride was dissolved in a warm mixture of 20 parts of water and 18 parts of the lactam of epsilon-amino-caproic acid. The solution was thickened by the additon of 50 parts of starch-tragacanth thickening. Then 6 parts of 20% tri-sodium-phosphate were added and the thoroughly mixed paste was printed onto cotton cloth. The print, after drying, was aged for 10 minutes in the rapid ager of the Mather-Platt type, immersed for 5 minutes in a cold solution containing per liter 15 g. BaCl₂, 50 g. NaCl and 30 cc. NaOH solution of 36° Bé. The print then was neutralized by immersing for 3 minutes in 0.16% hydrochloric acid at 140° F., rinsed and soaped. A yellow print of very much better strength and brilliancy was obtained than was possible in the absence of the caprolactam.

The print was much stronger than one made with a paste containing the same proportion of thiodiglycol instead of the lactam of epsilon-amino-caproic acid.

*Example XIII*

A paste of the following composition was printed onto cotton cloth:

| | |
|---|---|
| The product obtained by the reaction of benzoic-acid-m-sulfon-chloride upon the azo dye prepared by coupling diazotized m-chlor-aniline to the o-anisidide of 2-hydroxy-3-naphthoic-acid _____g__ | 6 |
| The lactam of epsilon-amino-caproic acid_g__ | 18 |
| Water_____cc__ | 20 |
| Starch-tragacanth thickening _____g__ | 50 |
| 20% tri-sodium-phosphate solution_____g__ | 6 |

The print was finished by the method described in Example I. There was obtained an orange print of very much greater strength and brilliancy than was obtained in the absence of the lactam.

*Example XIV*

Cotton cloth was printed with the following mixture:

| | |
|---|---|
| The product obtained by the reaction of benzoic-acid-m-sulfon-chloride upon the azo dye prepared by coupling diazotized m-chlor-aniline to the o-anisidide of 2-hydroxy-3-naphthoic-acid_____g__ | 6 |
| Formamide _____g__ | 18 |
| Water_____cc__ | 20 |
| Starch-tragacanth thickening_____g__ | 50 |
| 20% tri-sodium phosphate_____g__ | 6 |

The print was finished as described in Example I. An orange print resulted which was very much superior in strength and brilliancy to that obtained in the absence of the formamide.

*Example XV*

Cotton cloth was printed with the following paste:

| | |
|---|---|
| The product prepared by the action of benzoic-acid-m-sulfon-chloride upon the dye obtained by the condensation of two mols of beta-amino-anthraquinone and one mol of aniline with one mol of cyanuric chloride_____g__ | 6 |
| Formamide_____g__ | 18 |
| Water_____cc__ | 20 |
| Starch-tragacanth thickening _____g__ | 50 |
| 20% tri-sodium-phosphate solution_____g__ | 6 |

After finishing as in Example I, a yellow print was obtained which was very much brighter and stronger than that prepared in the absence of formamide.

*Example XVI*

Cotton cloth was printed with the following paste:

| | |
|---|---|
| The product prepared by the action of benzoic-acid-m-sulfon-chloride upon the azo dye obtained by coupling diazotized 2-amino-4-chloro-diphenyl-ether to the anilide of 2-hydroxy-3-naphthoic-acid____g__ | 6 |
| Methylol-acetamide_____g__ | 18 |
| Water_____cc__ | 20 |
| Starch-tragacanth thickening _____g__ | 50 |
| 20% tri-sodium-phosphate solution_____g__ | 6 |

The print was finished as described in Example I. A red print was obtained which was much stronger and brighter than that prepared in the absence of the amide.

Example XVII

Cotton cloth was printed with the following mixture:

| | | |
|---|---|---|
| The product prepared by the action of benzoic-acid-m-sulfon-chloride upon the azo dye obtained by coupling diazotized 2-amino-4-chloro-diphenyl-ether to the anilide of 2-hydroxy-3-naphthoic-acid | g | 6 |
| Di-ethanol-formamide | g | 18 |
| Water | cc | 20 |
| Starch-tragacanth thickening | g | 50 |
| 20% tri-sodium-phosphate solution | g | 6 |

The printed cloth was finished as described in Example I. A red print was obtained which was superior in brilliancy and strength to that prepared in the absence of the amide.

Example XVIII

Six grams of the product obtained by the reaction of benzoic acid-meta-sulphon-chloride upon the azo dye prepared by coupling diazotized meta-chloraniline with the ortho-toluidide of 2-hydroxy-3-naphthoic acid was dissolved in 18 g. of warm formamide. To this solution was added 20 cc. of water, 50 grams of starch-tragacanth thickening and 6 grams of 20% trisodium-phosphate solution. The paste was mixed thoroughly and printed from an engraved roll onto cotton cloth. The cloth was dried thoroughly in a hot flue and aged for 10 minutes in a rapid ager of the Mather-Platt type. The print was finished by the following steps: immersion for 5 minutes in a cold solution containing per liter 15 g. barium chloride, 50 g. of common salt and 30 cc. of caustic soda 36° Bé., neutralization by treating for 3 minutes at 140° F. in a bath containing 5 cc. of 37% hydrochloric acid per liter, rinsing, soaping 5 minutes at 160° F., rinsing and drying in a hot flue. An orange print resulted which was much stronger than that obtained using 18 g. of thiodiglycol in place of the 18 g. of formamide.

Example XIX

Six parts of the product of the reaction in pyridine solution between benzoic-acid-3,5-disulphon chloride and the azo dye obtained by coupling diazotized 4-chloro-2-amino-toluene to the ortho-toluidide of 2-hydroxy-3-naphthoic acid was dissolved in 18 parts of formamide. Twenty parts of water, 50 parts of starch-tragacanth thickening and 6 parts of a 20% solution of trisodium phosphate were added and the paste was mixed thoroughly. It was then printed onto cotton cloth by means of an engraved roll. The printed cloth was dried in a hot flue and aged for 10 minutes in a rapid ager of the Mather-Platt type. Then it was immersed, first for 5 minutes in a cold bath containing per 1000 parts, 15 parts of barium chloride, 50 parts of common salt and 40 parts of a caustic soda solution of 36° Bé.; then for 3 minutes at 140° F. in a bath containing per 1000 parts, 5 parts of 38% hydrochloric acid. The printed cloth then was rinsed, soaped and dried. A red print was obtained which was much brighter and much stronger than that obtained using 18 parts of thiodiglycol in place of the 18 parts of formamide.

Example XX

Cotton cloth was printed with the following paste:

| | | |
|---|---|---|
| The product obtained by the reaction of benzoic-acid-meta-sulphon-chloride upon the azo dye obtained by coupling diazotized 4-benzoylamino-2,5-diethoxy aniline to the anilide of 2-hydroxy-3-naphthoic acid | g | 1.5 |
| Formamide | g | 18.0 |
| Water | cc | 24.5 |
| Starch-tragacanth thickening | g | 50 |
| 20% trisodium phosphate solution | g | 6 |

The printed cloth was finished as described in Example I. A blue print was obtained which was much brighter than that obtained by using 18 g. of thiodiglycol in place of the 18 g. of formamide.

Example XXI

Cotton cloth was printed with a paste of the following composition:

| | | |
|---|---|---|
| The product obtained by the reaction of benzoic-acid-meta-sulphon-chloride upon the azo dye obtained by coupling diazotized 2-amino-4-chloro-diphenyl ether to the anilide of 2-hydroxy-3-naphthoic acid | g | 6 |
| N-formyl-isobutyl amine | g | 18 |
| Water | cc | 20 |
| Starch-tragacanth thickening | g | 50 |
| 20% trisodium phosphate solution | g | 6 |

The printed cloth was finished as described in Example I. A red print resulted which was much brighter than that obtained by the use of 18 g. of thiodiglycol in place of the 18 g. of N-formyl-isobutyl-amine.

Example XXII

Cotton cloth was printed with a paste of the following composition:

| | | |
|---|---|---|
| The product obtained by the reaction of benzoic-acid-meta-sulphon-chloride upon the azo dye prepared by coupling diazotized 2-amino-4-chloro-diphenyl ether to the anilide of 2-hydroxy-3-naphthoic acid | g | 6 |
| Acetamide | g | 18 |
| Water | cc | 20 |
| Starch-tragacanth thickening | g | 50 |
| 20% trisodium-phosphate solution | g | 6 |

The printed cloth was finished as described in Example I. A red print resulted which was much brighter than that obtained by the use of 18 g. of butyramide in place of the 18 g. of acetamide.

Example XXIII

Cotton cloth was printed with a paste having the following composition:

| | | |
|---|---|---|
| The product obtained by the reaction of benzoic-acid-meta-sulphon-chloride upon the azo dye prepared by coupling diazotized 2-amino-4-chloro-diphenyl ether to the anilide of 2-hydroxy-3-naphthoic acid | g | 1.5 |
| N,N-dimethyl-acetamide | g | 18 |
| Water | cc | 24.5 |
| Starch-tragacanth thickening | g | 50 |
| 20% trisodium-phosphate solution | g | 6 |

The printed cloth was finished as described in Example I. A red print resulted which was very much stronger than that obtained by the use of 18 g. of thiodiglycol in place of the 18 g. of N,N-dimethyl-acetamide.

Example XXIV

Cotton cloth was printed with a paste having the following composition:

| | |
|---|---|
| The product obtained by the action of benzoic-acid-meta-sulphon-chloride upon the dye prepared by the condensation of 2 mols of beta-amino-anthraquinone and one mol of aniline with one mol of cyanuric chloride ---g-- | 6 |
| Glycolic acid amide ---g-- | 18 |
| Water ---cc-- | 20 |
| Starch-tragacanth thickening ---g-- | 50 |
| 20% trisodium-phosphate solution ---g-- | 6 |

The printed cloth was finished as described in Example I. A yellow print was obtained which was much brighter than that obtained by substituting 18 g. of thiodiglycol for the 18 g. of glycolic acid amide.

Other printing pastes were made similar to those of the foregoing examples except that they contained butyramide instead of the amides disclosed. The butyramide was found to have a tendency to crystallize out in the printing paste. This action interferred with and sometimes prevented the production of satisfactory prints with such compositions.

The starch tragacanth thickening used in the foregoing illustrations was made as follows:

80 parts of wheat starch,
360 parts of a 6% aqueous solution of gum tragacanth and
510 parts of water were mixed, heated to the boiling point and held at this temperature for 15 minutes. The paste was then cooled to room temperature and mixed with
50 parts of glycerine.

Any amount of a thickening agent can be used which will give the printing paste a viscosity which is suitable for printing. Any of the materials useful for making thickening agents for printing pastes can be used instead of starch and tragacanth, such as starch, locust bean gum, gum karaya, gum tragacanth, gum arabic, dextrin, agar, vegetable colloid and various mixtures of these materials. More or less of the thickening agent will be required in order that the printing paste will have a suitable viscosity to operate satisfactorily on the etched roller or other printing device. The proportion can be widely varied and determined by experiment according to various circumstances, such as the characteristics of the printing member and the material upon which the prints are to be disposed.

The printing paste preferably contains an alkaline buffer, especially when the paste is not to be used within a relatively short time after it is prepared. Such a buffer as recited in the examples is optional when the paste is to be used immediately after it is made. When present, the alkaline buffer is present in sufficient amount to prevent the paste becoming acid to litmus and should be insufficient to hydrolyze the dye derivative before the paste is applied to the fabric. The paste is operable without an alkaline buffer, but for optimum results and in cases where the paste is not used soon after it is prepared, the alkaline buffer is desirable. Any alkaline buffer for printing pastes can be used instead of trisodium phosphate, such as other alkali metal phosphates and the alkali metal carbonates.

Water is present in the paste in at least sufficient amount to provide a smooth uniform composition. More or less can be present with a given amount of other constituents according to the consistency desired.

A noticeable effect in the brilliance and strength of the prints is produced when about 1% of the weight of the printing paste consists of the assistant. The presence of more than about 35% of assistant is unnecessary but more can be present. The preferred proportion of assistant in the paste is about 15% to about 20% by weight. The preferred assistants are the lactam of epsilon-amino-caproic acid, glycol amide and aliphatic amides represented by the formula $H-CO-NR''R'''$ in which $R''$ and $R'''$ are each one of a group consisting of hydrogen, methyl and hydroxymethyl. Of the latter group formamide is preferred.

The proportion of dye derivative in the paste can be varied over a wide range according to the depth of shade desired in the final print. More or less of the dye derivative per unit of printing paste generally produces a greater or less depth of shade as the case may be. Any proportion of dyestuff which is sufficient to give a print can be used.

In the foregoing illustrations the prints were produced on cotton cloth but the invention is not restricted to cotton fibers. The invention is applicable to all dyeable fabrics which are susceptible to dyeing with the described class of dyes. A wide variety of fibers such as linen, jute, ramie, regenerated cellulose, cellulose esters and ethers, wool silk, mixtures of these fibers and the like can be used. Wide variations can be made in the finishing process. For example, any strong alkaline reagent which is sufficient in concentration to saponify the acyl group of the dye derivative on the fiber and yield the insoluble azo dye can be used. The desired saponifying agent can be selected in view of the kind of fiber dyed, the speed of saponification desired and other variables. In like manner the final acid treatment, the time temperature of treatment and the concentrations of reagents can be selected over a wide range.

As other illustrations of water-solubilized derivatives of insoluble dyes having the formula R—M as hereinbefore described and which give improved results when used with the assistants described herein are the product of the reaction between benzoic-acid-m-sulfon-chloride and the azo dye alpha-naphthylamine → beta-naphthol, the product of the reaction between benzoic-acid-3:5-disulfon-chloride and the azo dye benzidine⇌(beta-naphthol)$_2$, the product of the reaction between benzoic-acid-m-sulfon-chloride and the azo dye p-anisidine → p-cresol, the product of the reaction between benzoic-acid-m-sulfon-chloride and the azo dye 4-chloro-2-amino-toluene → 2':3'-hydroxy - naphthoyl - 2-amino-4-methoxy-toluene, the product of the reaction between benzoic-acid-m-sulfon-chloride and the azo dye 4-chloro-2-amino-anisole → 2':3'-hydroxy-naphthoyl - 2 - amino - anisole, the product of the action of benzoic-acid-m-sulfon-chloride upon the azo dye 4-nitro-2-amino-toluene → 2:3-hydroxy-naphthoic - acid-anilide, the product obtained by the action of benzoic-acid-3:5-disulfon-chloride upon 1:5-di- (benzoyl amino)-4:8-dihydroxy-anthraquinone, the product obtained by the action of 4-chloro-methyl-benzoyl-chloride in pyridine solution upon the azo dye 2-methyl-4:4'-diamino-5-methoxy-azo-benzene⇌(beta-naphthol)₂, the product obtained by the action of benzoic-acid-disulfon-chloride upon the azo dye xylidine → 2-(m-amino-benzoyl-amino-5-hydroxy-naphthalene-7-sulfonic acid → beta-naphthol, the product of the reaction in pyridine between 4-chloro-methyl-benzoyl-chloride and the azo dye alpha-naphthylamine → beta-naphthol, the product of the reaction of benzoic-acid-3:5-disulfon-chloride upon the azo dye aniline → 2:4-dihydroxy-quinoline, the product of the reaction of benzoic-acid-3:5-disulfon-chloride upon the azo dye 4:4'-diamino-diphenyl-urea⇌(beta-naphthol)₂ the product of the reaction of benzoic-acid-m-sulfon-chloride upon the azo dye 4:4'-diamino-diphenylamine⇌(beta-naphthol)₂ the product of the reaction of benzoic-acid-3:5-disulfon-chloride upon 1-hydroxy-4-(p-tolyamino)-anthraquinone, the product of the reaction in pyridine between 4-(chloro-methyl)-benzoyl chloride upon dihydroxy-N-dihydro-1:2:2':1'-anthraquinone azine, the product of the reaction in pyridine between 4-(chloro-methyl)-benzoyl-chloride and Erichrome Azurol (Color Index No. 720), the product of the reaction in pyridine between 4-(chloro-methyl)-benzoyl-chloride and Modern Violet (Color Index No. 892), and the products made by condensing 1 mol of cyanuric chloride with any of the following combinations, namely:

Two mols of 1- or 2-amino-anthraquinone and one mol of ammonia,
Two mols of 2-amino-anthraquinone and one mol of ethylamine,
Two mols of 2-amino-anthraquinone and one mol of para toluidine,
Two mols of 2-amino-anthraquinone and one mol of alpha naphthylamine,
Two mols of 2-amino-anthraquinone and one mol of beta naphthylamine,
Two mols of 2-amino-anthraquinone and one mol of mono-amyl-amine,
One mol of 1-amino-anthraquinone and two mols of aniline or
Two mols of 1-amino-4-methoxy-anthraquinone and one mol of ammonia.

The assistants must possess at least sufficient miscibility with water so that they can be incorporated into a hydrous printing paste. As other illustrations of assistants which give the desired described results are mentioned methyl-formamide, dimethyl-formamide, ethyl-formamide, diethyl-formamide, n-propyl-formamide, di-(n-propyl)-formamide, isopropyl-formamide, di-(isopropyl)-formamide, n-butyl-formamide, di-(n-butyl)-formamide, isobutyl-formamide, di-(isobutyl)-formamide, methyl-ethyl-formamide, hydroxy-methyl-formamide, beta-hydroxy-ethyl-formamide, di-(beta-hydroxy-ethyl)-formamide, isoamyl-formamide, beta-hydroxy-n-propyl-formamide, di-hydroxy-tertiary-butyl-formamide

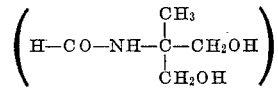

tri-hydroxy-tertiary-butyl-formamide

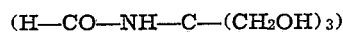

beta, gamma-dihydroxy-n-propyl-formamide, methyl-acetamide, dimethyl-acetamide, ethyl-acetamide, diethyl-acetamide, n-propyl-acetamide, isobutyl-acetamide, methyl-ethyl-acetamide, hydroxy-methyl-acetamide, beta-hydroxy-ethyl-acetamide, di-(beta-hydroxy-ethyl)-acetamide, beta-hydroxy-n-propyl-acetamide, dihydroxy-tertiary-butyl-acetamide, trihydroxy-tertiary-butyl-acetamide, beta, gamma-dihydroxy-n, propyl-acetamide, chloro-acetamide, N-methyl-chlor-acetamide, N:N-dimethyl-chlor-acetamide, brom-acetamide, N-methyl-brom-acetamide, N-ethyl-brom-acetamide, N-methyl-glycolamide, N:N-dimethyl-glycolamide, N-ethyl-glycolamide, N:N-diethyl-glycolamide, N-n-propyl-glycolamide, N-isobutyl-glycolamide, N-beta-hydroxy-ethyl-glycolamide, N:N-di-(beta-hydroxy-ethyl)-glycolamide, the amide of methoxy-acetic-acid, the methyl-amide of methoxy-acetic-acid, the dimethyl-amide of methoxy-acetic-acid, the ethyl-amide of methoxy-acetic-acid, the beta-hydroxy-ethyl-amide of methoxy-acetic-acid, the di-(beta-hydroxy-ethyl)-amide of methoxy-acetic-acid, the amide of ethoxy-acetic-acid, the methyl-amide of ethoxy-acetic-acid, the di-methyl-amide of ethoxy-acetic-acid, the beta-hydroxy-ethyl-amide of ethoxy-acetic-acid, the di-(beta-hydroxy-ethyl)-amide of ethoxy-acetic-acid, propionamide, methyl-propionamide, di-methyl-propionamide, ethyl-propionamide, beta-hydroxy-ethyl-propionamide, alpha-chloro-propionamide, beta-chloro-propionamide, the lactam of gamma-amino-butyric acid (i. e. pyrrolidone), the lactam of gamma-amino-valeric-acid (i. e. piperidone), the lactam of gamma-amino-valeric-acid and the lactam of delta-amino-valeric acid.

Various other acyl groups can be used instead of those mentioned in the foregoing examples for the purpose of solubilizing the described insoluble dyes and hydrolyzed off by similar means after the solubilized dyes are applied to the fiber. As illustrations of such are mentioned the acyl groups corresponding to the following acids: benzene-1,3-disulfonic acid, naphthalene-1,3,6-trisulfonic acid, naphthalene-1,5-disulfonic acid, benzene-1,3,5-tricarboxylic acid, benzene-hexa-carboxylic acid, toluene-2,4-disulfonic acid, sulfo-acetic acid, sulfobutyric acid, the condensation product of 4-(chloro-methyl)-benzoyl chloride and pyridine, and many others of the kind. The described type of assistants give improved results which are similar to those heretofore described with the dyes which are solubilized with such solubilizing agents.

The amides of the described classes have a marked beneficial effect in printing with the described dyestuffs. There is a possibility that the amide affects the particle size or state of division of the insoluble dyestuff when saponification of the water-solubilized dye derivative takes place on the fiber, thus causing the fiber to be colored a brighter and stronger shade. There is also a possibility that the amide causes a swelling of the fiber which assists in the penetration of the color into the fiber. The causes for the beneficial effect of the described amides are not well understood and it is to be understood that the invention is not limited by the suggested theories.

The printing pastes containing the water-solubilized derivatives of the described class of dyes and the described amides produce brighter and stronger prints from a given quantity of color than can be obtained without the assistants. The strength and brilliancy of the prints is obtained in accordance with the present invention without the use of compounds having unpleasant odor, instability and other disadvantages. Wide variations in the processes can be made, such as the use of various alkalies for saponification instead of caustic soda and the use of suitable organic and other inorganic acids instead of hydrochloric acid. It will be understood that variations in the time, temperatures of treatment and the concentration of the several agents can be made.

From the foregoing disclosure it will be recognized that the invention is susceptible of modification without departing from the spirit and scope thereof and it is to be understood that the invention is not restricted to the special illustrations thereof herein set forth.

We claim:

1. A hydrous printing paste which contains a thickener which is sufficient to make the paste suitably viscous for printing; a water-soluble condensation product of a substantially insoluble dye which is represented by the general formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and of generating thereby the insoluble dyestuff by the action of an alkaline reagent after the solubilized dyestuff is applied to the fiber; and at least 1% of a compound of the group represented by the formulae

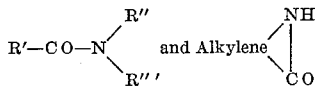

wherein R' is one of a group consisting of hydrogen, methyl, ethyl, and the hydroxy-, methoxy-, ethoxy-, and halogen-derivatives of methyl and ethyl; the group

represents an amine group wherein R'' and R''' are each connected only to nitrogen and each is from the group consisting of hydrogen, alkyl having 1 to 5 carbons and the corresponding hydroxyalkyl groups; R'' and R''' jointly with nitrogen are the radicals of piperidine and morpholine; and Alkylene is an alkylene radical having 3 to 5 carbons.

2. A hydrous printing paste which contains a thickener which is sufficient to make the paste suitably viscous for printing; a water-soluble condensation product of a substantially insoluble dye which is represented by the general formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and of generating thereby the insoluble dyestuff by the action of alkalies after the solubilized dyestuff is applied to the fiber; and about 15% to about 20% by weight of a compound of the group represented by the formulae

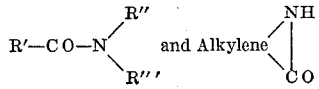

wherein R' is one of a group consisting of hydrogen, methyl, ethyl, and the hydroxy-, methoxy-, ethoxy-, and halogen-derivatives of methyl and ethyl; the group

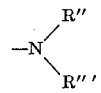

represents an amine group wherein R'' and R''' are each connected only to nitrogen and each is from the group consisting of hydrogen, alkyl having 1 to 5 carbons, the corresponding hydroxyalkyl groups; R'' and R''' jointly with nitrogen are the radicals of piperidine and morpholine, and Alkylene is an alkylene radical having 3 to 5 carbons.

3. A hydrous printing paste which contains a thickener which is sufficient to make the paste suitably viscous for printing; a water-soluble condensation product of a substantially insoluble dye which is represented by the general formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and of generating thereby the insoluble dyestuff by the action of alkalies after the solubilized dyestuff is applied to the fiber; and about 15% to about 20% of formamide.

4. A hydrous printing paste which contains a thickener which is sufficient to make the paste suitably viscous for printing; a water-soluble condensation product of a substantially insoluble dye which is represented by the general formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and of generating thereby the insoluble dyestuff by the action of alkalies after the solubilized dyestuff is applied to the fiber; and about 15% to about 20% of glycolamide.

5. A hydrous printing paste which contains a thickener which is sufficient to make the paste suitably viscous for printing; a water-soluble condensation product of a substantially insoluble dye which is represented by the general formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and of generating thereby the insoluble dyestuff by the action of alkalies after the solubilized dyestuff is applied to the fiber; and about 15% to about 20% of the lactam of epsilon-aminocaproic acid.

6. The process which comprises printing on a dyeable textile with a printing paste which contains a thickener which is sufficient to make the paste suitably viscous for printing; a water-soluble condensation product of a substantially insoluble dye which is represented by the general formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and of generating thereby the insoluble dyestuff by the action of an alkaline reagent after the solubilized dyestuff is applied to the fiber; and at least 1% of a compound of the group represented by the formulae

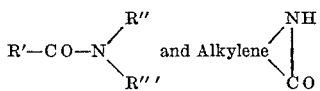

wherein R' is one of a group consisting of hydrogen, methyl, ethyl, and the hydroxy-, methoxy-, ethoxy-, and halogen-derivatives of methyl and ethyl; the group

represents an amine group wherein R'' and R''' are each connected only to nitrogen and each is from the group consisting of hydrogen, alkyl having 1 to 5 carbons and the corresponding hydroxyalkyl groups; R'' and R''' jointly with nitrogen are the radicals of piperidine and morpholine, and Alkylene is an alkylene radical having 3 to 5 carbons.

MILES A. DAHLEN.
CHARLES J. SALA.
RICHARD A. SHIMP.